United States Patent [19]
Frenkel et al.

[11] Patent Number: 6,056,987
[45] Date of Patent: May 2, 2000

[54] TWO-STAGE PROCESS FOR HEATING SKINS OF FRUIT

[75] Inventors: Robert Leland Frenkel; Zhijun Weng, both of Fresno, Calif.

[73] Assignee: FMC Corporation, Del.

[21] Appl. No.: 09/144,169

[22] Filed: Aug. 31, 1998

[51] Int. Cl.[7] ........................................ A23N 7/00
[52] U.S. Cl. .................... 426/510; 426/482; 426/511
[58] Field of Search .................... 426/510, 511, 426/482, 483; 99/584

[56] References Cited

U.S. PATENT DOCUMENTS

| | | | |
|---|---|---|---|
| 4,101,682 | 7/1978 | Kunz | 426/511 |
| 4,707,372 | 11/1987 | Catelli | 426/511 |
| 5,682,812 | 11/1997 | Dahl et al. | 99/584 |

OTHER PUBLICATIONS

"SP–20 Steam Peeler System", FMC Corporation brochure (1993).

Floros, et al., "Microstructural Changes During Steam Peeling of Fruits and Vegetables", *Journal of Food Science*, vol. 53(3), pp. 849–853 (1988).

*Primary Examiner*—George C. Yeung
*Attorney, Agent, or Firm*—Flehr Hohbach Test Albritton & Herbert

[57] ABSTRACT

A two-stage steam peeler for peeling the skins of fruit, such as tomatoes, from the body of the fruit, comprising an infeed conveyor (10), a feed valve (12), a pressurized steam chamber (14), an outlet vacuum valve (16), a flexible cable peeler (20), and a pinch roller assembly (22). A first stage heater is provided by an enclosure (90) and steam introduction device (100) that preheats the tomatoes prior to entry into feed valve (12).

7 Claims, 9 Drawing Sheets

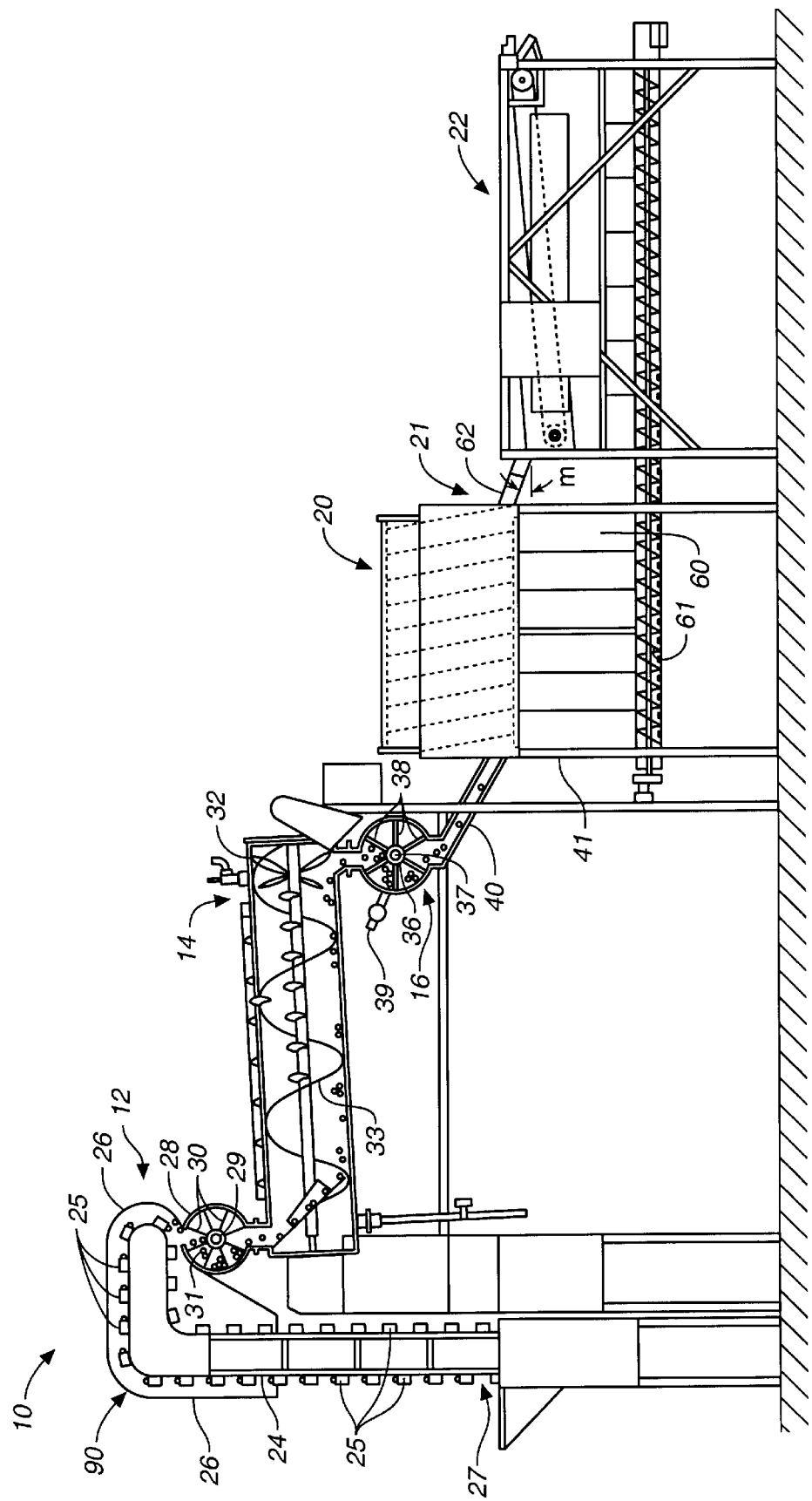
FIG._1

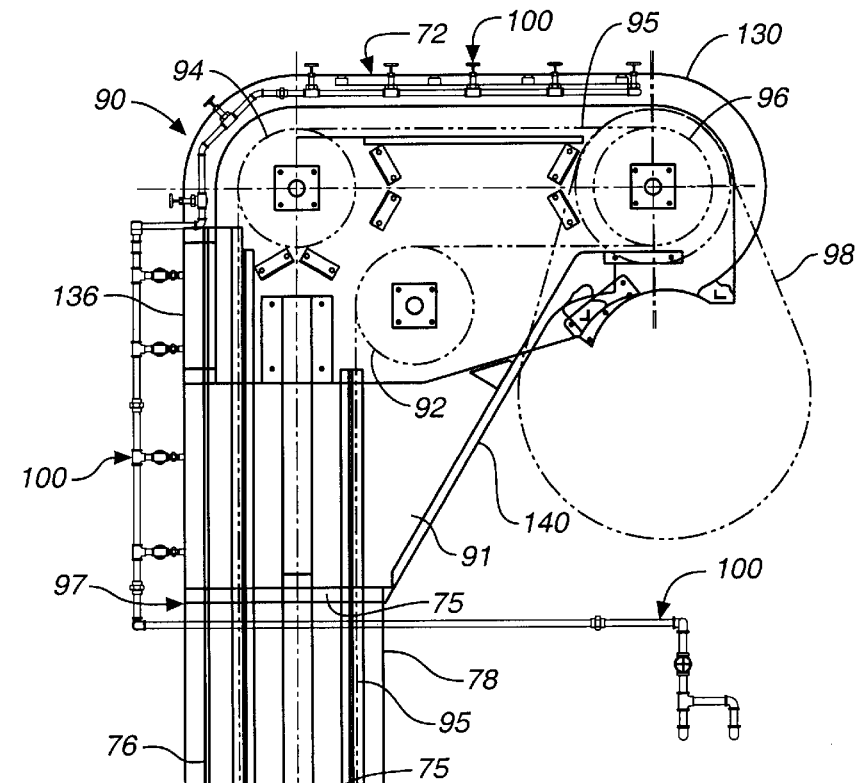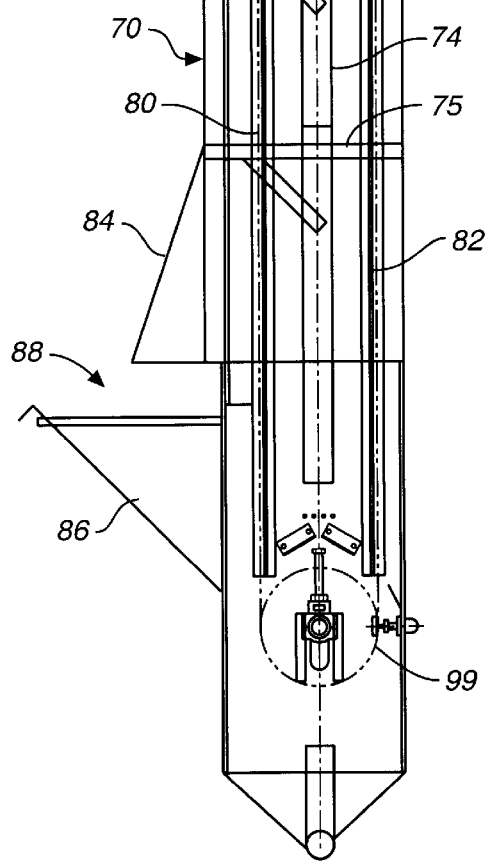
FIG._2

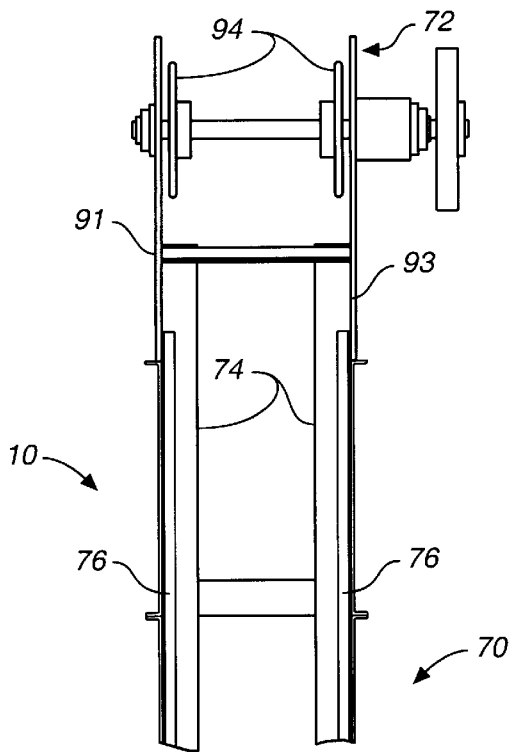
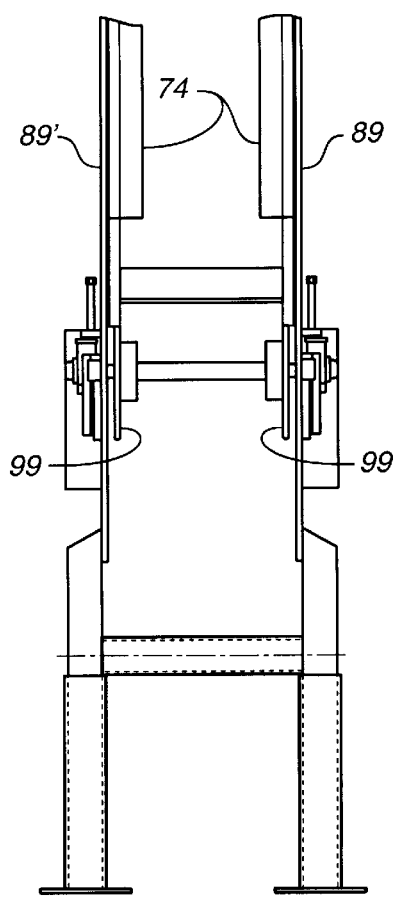
FIG._3

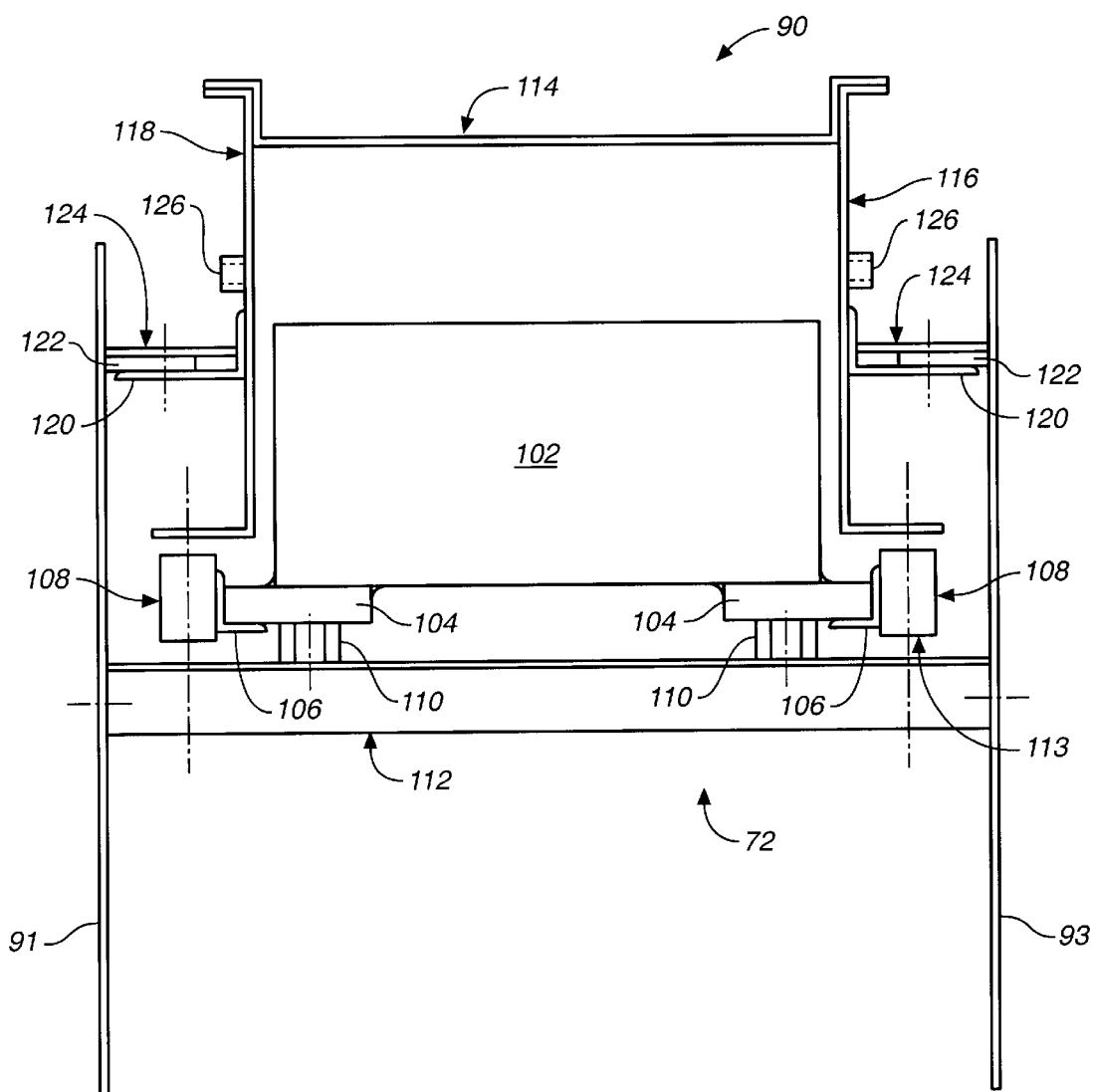
FIG._4

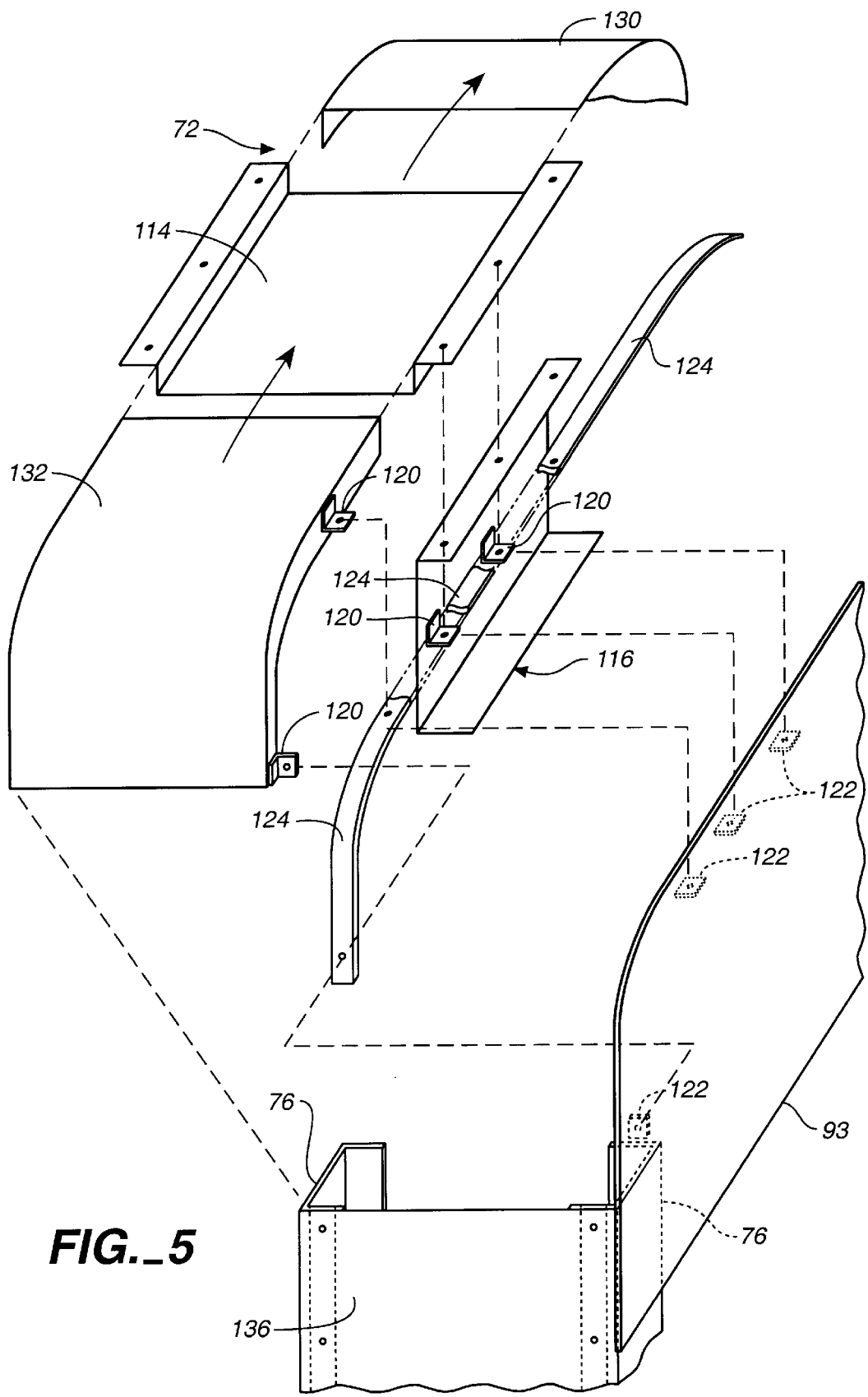
FIG._5

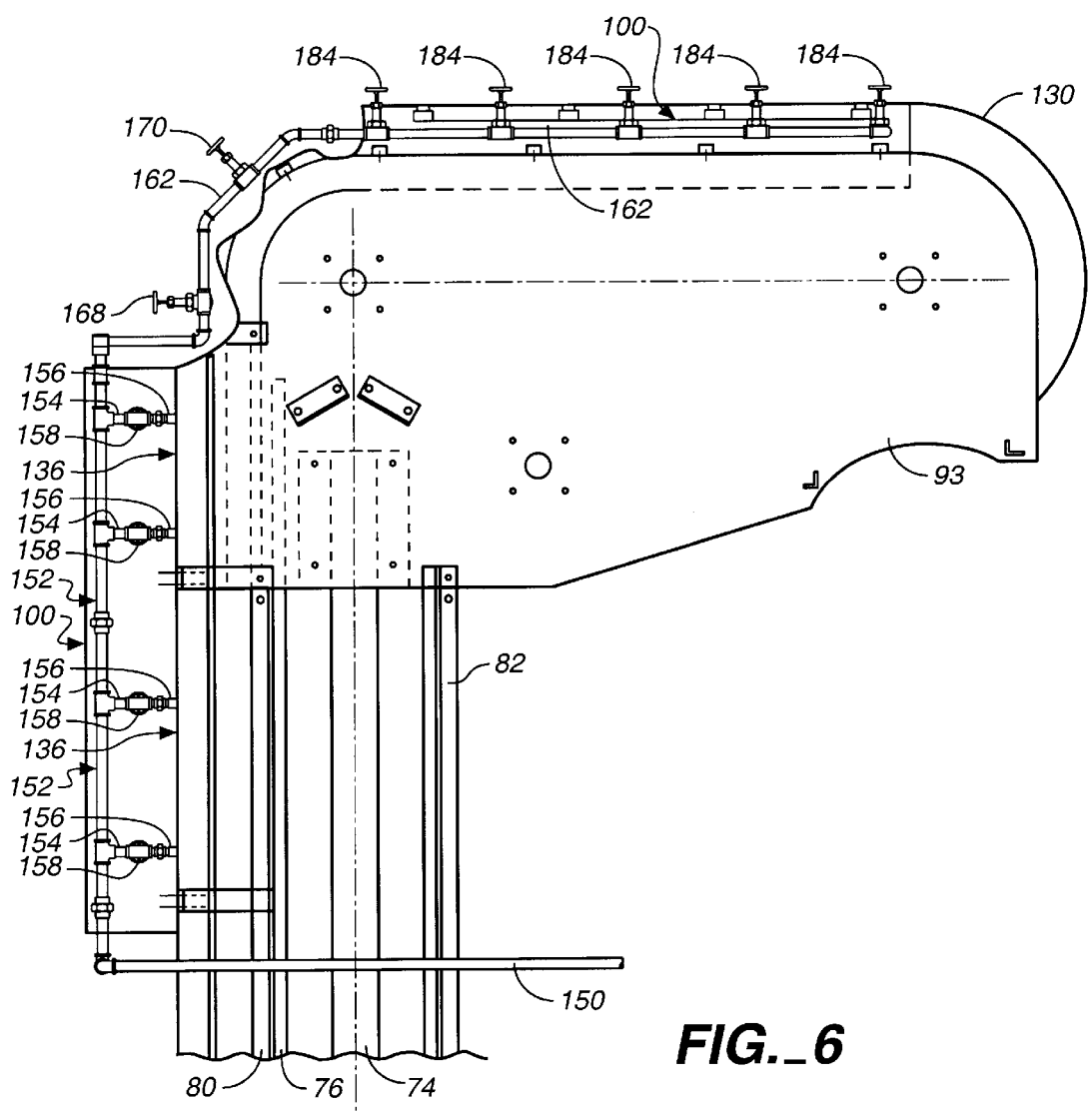
FIG._6

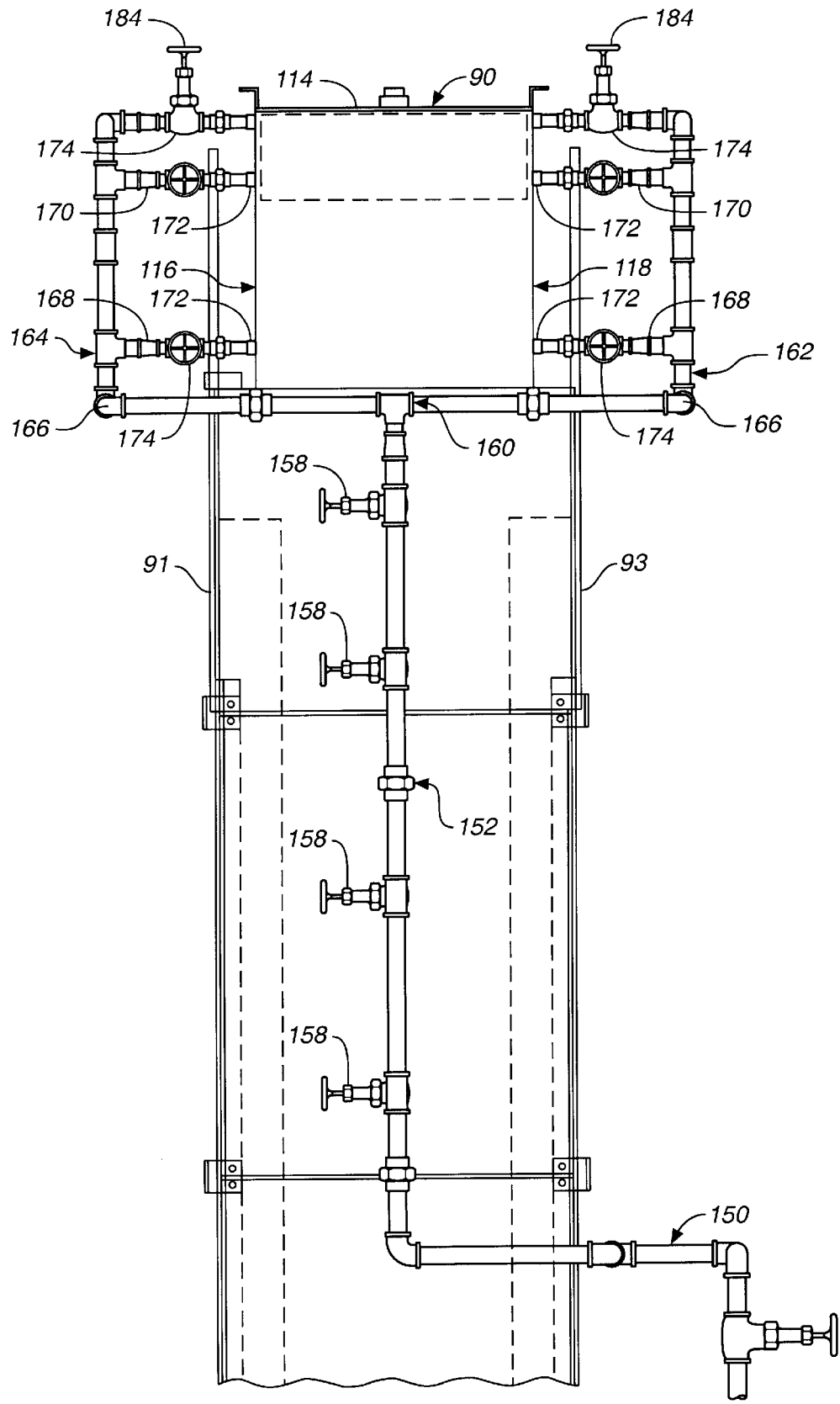
FIG._7

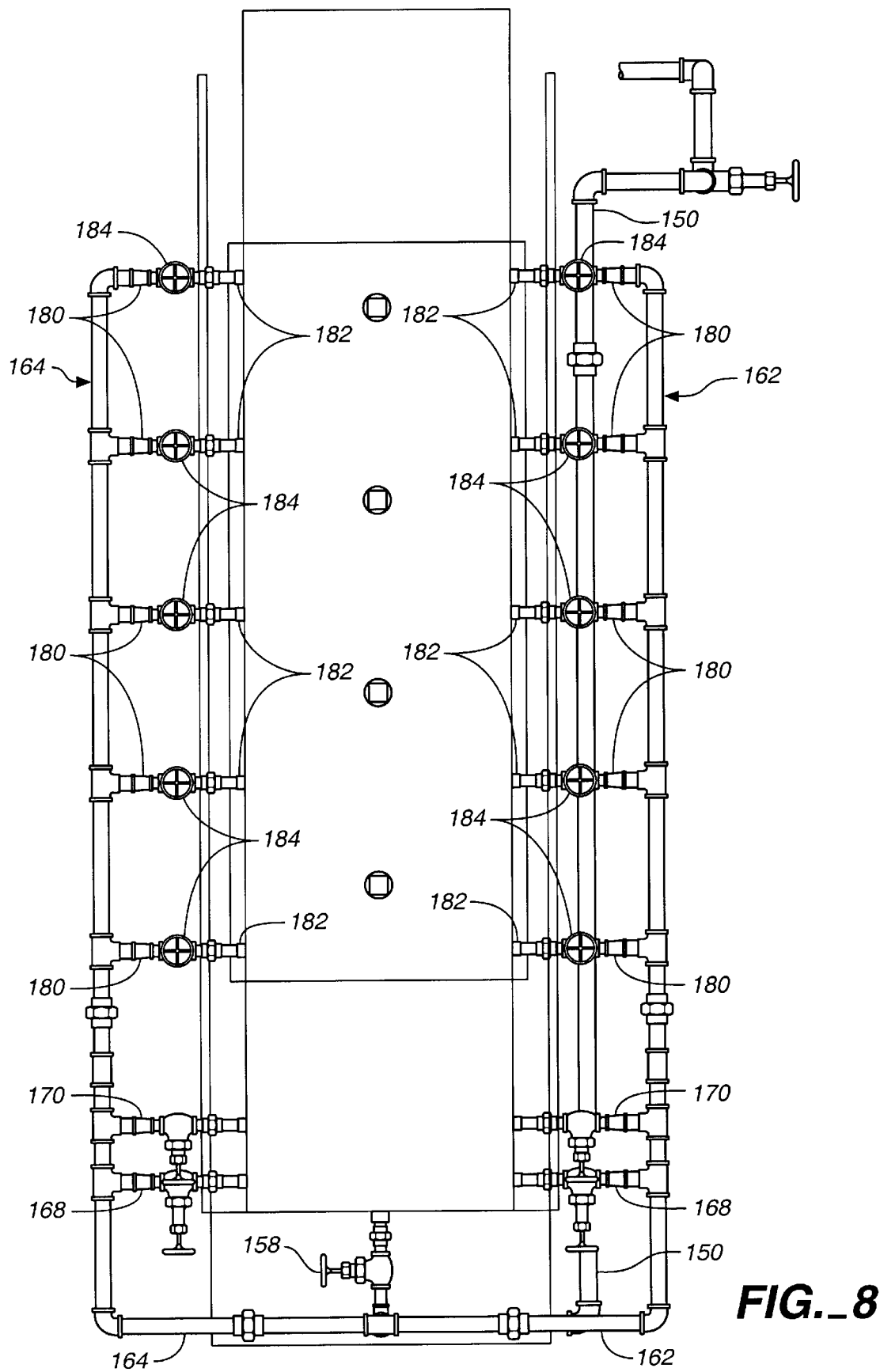
FIG._8

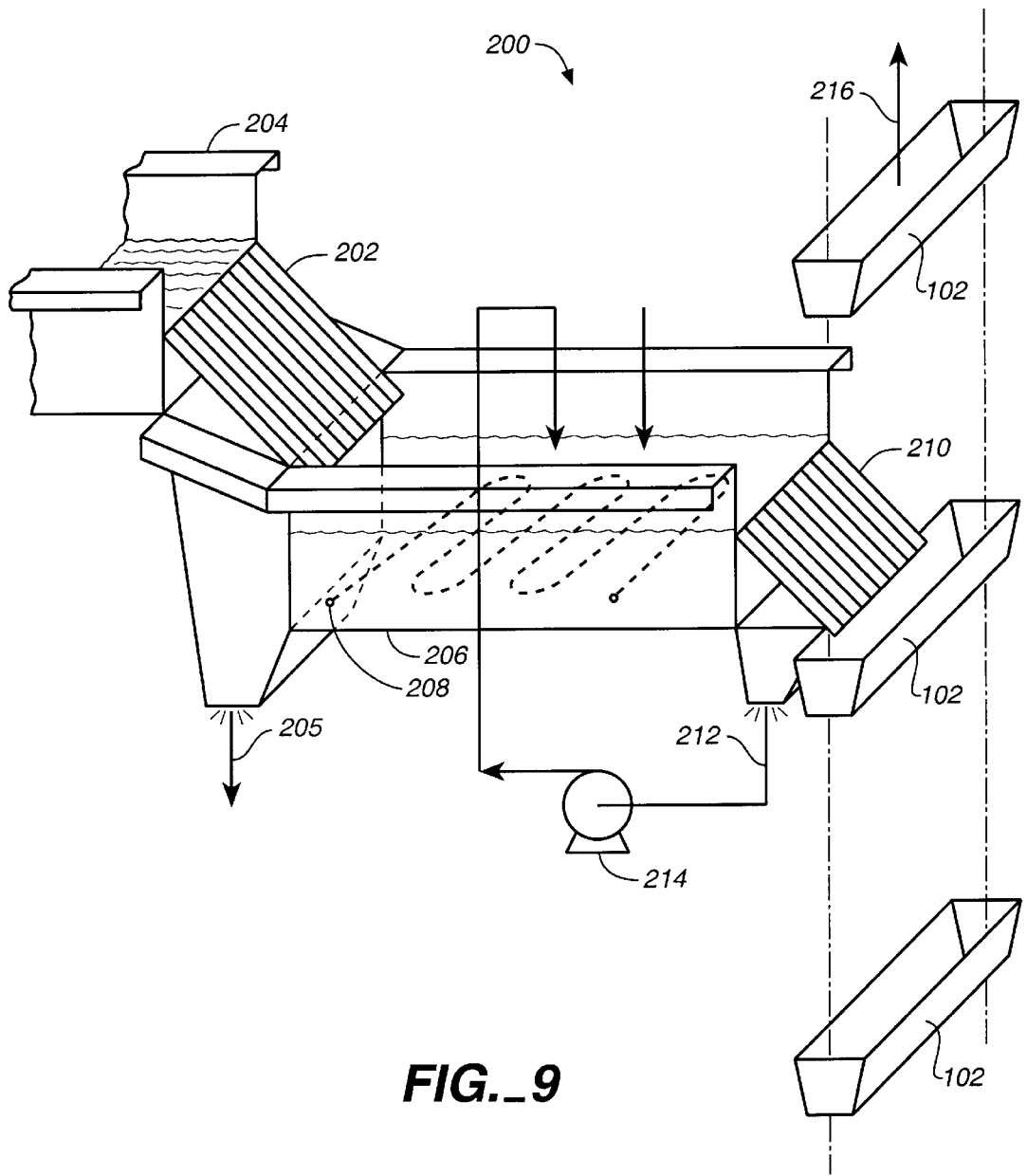
FIG._9

TWO-STAGE PROCESS FOR HEATING SKINS OF FRUIT

TECHNICAL FIELD

The present invention relates to steam peeler apparatus for separating tomato skins from the bodies of tomatoes and, more particularly, to a two-stage process for heat treating tomatoes in a manner that minimizes loss of tomato tissue.

BACKGROUND ART

It is desirable to minimize loss of tomato tissue, that is tissue from the body of a tomato, when separating the skins from the tomatoes. A common device for heat treating tomatoes to separate their skins is a steam peeler, which is a pressurized chamber of hot, saturated steam through which tomatoes are conveyed for a relatively short period of time to heat their skins, which causes the skin material to break away from the tomato body. After the steam peeler, the tomatoes move through scrubbers, which physically remove the skins. The assignee of the application herein, FMC Corporation of Madera, Calif., USA, manufactures a steam peeler apparatus, Model SP-20, which is a complete tomato peeler system in which the present invention is designed for use. FMC's brochure "SP-20 STEAM PEELER SYSTEM" describes the peeling process in more detail and is incorporated herein by reference.

It is known that subjecting tomatoes to a two-stage heating process reduces loss of tomato tissue during peeling due to a reduction in breakdown of skin cell structure. Two-stage heating has a minimum effect on inner mesocarp cells of tomatoes, and results in localized breakdown of the first couple layers of skin cells. An article "Microstructure of Steam Peeling", Journal of Food Science, Vol. 53, No. 3, 1988, discusses in more detail the science and advantages of two-stage heating. This article is also incorporated herein by reference.

U.S. Pat. No. 5,862,812 of Dahl et al., entitled "Fruit Steam Peeler," discloses a fruit peeler system that includes a conveyor belt elevator that delivers tomatoes to a pressure steam auger wherein high pressure steam separates the skins from the tomatoes. Tomatoes then pass into a flexible cable peeler and then to a pinch roller assembly, to remove the skins from the tomatoes. The '812 patent is also incorporated herein by reference. The capacity of a continuous, auger-type pressure steam peeler is limited by the number of tomatoes that can be exposed to steam. This is due to the decreasing percentage of surface area effectively exposed as the depth of fruit increases with increased throughput. For a given geometry and residency time, the depth of product is a function of the RPM and volume of fruit fed into the auger. Increasing throughput while keeping the fill level at its optimum level requires that the residency time be shortened. This reduces the amount of time available to heat the product and as a result, processing rates for industry standard auger-type steam peelers has been limited to throughput of approximately 20 tons/hr.

An object of the present invention is to increase capacity of auger-type steam peelers beyond present capabilities while still maintaining minimum tomato tissue loss.

DISCLOSURE OF INVENTION

Briefly described, the two-stage steam peeler of the present invention includes an infeed conveyor for delivering fruit to a pressurized steam chamber and an enclosure for enclosing part of the infeed conveyor immediately adjacent the steam peeler. A steam introduction device introduces steam into the enclosure for the purpose of preheating the skins as part of a first stage of the two stage heating process. The pressurized steam chamber comprises the second stage of a two stage heating process. The outer skin layers of the fruit are heated in the first stage and the inner skin layers are heated to the extent necessary to remove the skins after the second stage.

According to an aspect of the invention, the infeed conveyor includes a vertical section followed by a horizontal section and the enclosure encloses the horizontal section and at least a part of the vertical section. The steam introduction device includes a series of steam nozzles positioned to direct steam into the vertical section of the enclosure. The steam introduction device also includes a series of steam nozzles positioned to direct steam into the horizontal section of the enclosure. The steam nozzles for the horizontal section are spaced laterally to direct steam into the enclosure from the sides of the conveyor.

According to another aspect of the invention, a feed valve transfers fruit from the enclosure to the pressurized steam chamber, and the feed valve includes an inlet opening for receiving fruit from the conveyor. The enclosure surrounds the inlet opening so that the fruit moves immediately from the first stage of heating into the feed valve.

According to another aspect of the invention, the enclosure and steam introduction device extend down along the vertical section a distance corresponding to the through-put of fruit by the steam peeler apparatus. A greater through-put generally requires a longer first stage heating enclosure.

According to another embodiment of the two-stage steam peeler, the first stage heater includes a hot water flume. Preferably, the hot water flume includes a steam coil or heat exchanger for heating the water.

The present invention also comprises a method of heating skins of fruit and includes the steps of conveying the fruit on a conveyor to a pressurized steam chamber, while the fruit is being conveyed to the pressurized steam chamber, pre-heating the fruit with steam heat within an enclosure of the conveyor that raises the temperature of the fruit skins to a first predetermined temperature, and in the pressurized steam chamber, heating the skins of the fruit with steam heat to a second predetermined temperature sufficient to separate the skins of the fruit upon flashing of steam.

According to as aspect of the method, the step of conveying the fruit to a pressurized steam chamber includes conveying the fruit first up a vertical conveyor section and then horizontally to the steam chamber. Preferably, the step of pre-heating the fruit with steam heat includes directing steam through a series of nozzles positioned along the vertical and horizontal conveyor sections.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a schematic view of the improved fruit steam peeler assembly of the present invention;

FIG. 2 is a side elevation view of the conveyor and first stage heater enclosure of the steam peeler assembly of FIG.

1, with a side panel removed to show the interior structure of the conveyor;

FIG. 3 is a fragmentary, end elevation view of the conveyor of FIG. 2, with the end panels removed to show the interior structure of the conveyor:

FIG. 4 is a sectional view of the horizontal section of the conveyor of FIG. 2;

FIG. 5 is an exploded pictorial view of the part of the heating enclosure of the horizontal heating section; FIG. 6 is an enlarged cut-away view of the conveyor and first stage heater enclosure;

FIG. 7 is an end elevation view of the conveyor and first stage heater enclosure of FIG. 6;

FIG. 8 is a top plan view of the conveyor and first stage heater of FIGS. 6 and 7;

FIG. 9 is an alternative embodiment for a first stage heater for use with the second stage heater of FIG. 1.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

The fruit steam peeler system shown in FIG. 1 includes an elevator conveyor 10 for delivering fruit to a pressure inlet feed valve 12, which transfers the fruit to a pressure steam chamber 14. In steam chamber 14, the skins of the fruit are subject to saturated steam, which raises the temperature of the skins and adjacent fruit tissue material. Heated fruit is then transferred by a pressure outlet valve 16 in which a vacuum is drawn to separate the skins from the fruit. From outlet valve 16, fruit is transferred to a flexible cable peeler 20 where the skins are removed, and then through a discharge chute 21 to a pinch roller assembly 22, which removes any residual skin material.

Elevator conveyor 10 comprises an endless conveyor chain 24 that follows an L-shaped, circular path. The path along which fruit is conveyed extends upwardly from an infeed point 27, horizontally for a short segment, and then downwardly into feed valve 12. A plurality of buckets 25 are mechanically connected to the conveyor belt 24 and each bucket carries a small quantity of fruit to feed valve 12. A conveyor housing enclosure 26 surrounds the horizontal part of conveyor belt 24, as well as the upper portion of the vertical conveyor section. The semi-circular, curved forward end of enclosure 26 functions in part to direct fruit down into feed valve 12 as the fruit is carried and pushed by the buckets down and around the forward end of the horizontal conveyor section.

Pressure inlet feed valve 12 includes a circular housing 28 and a rotor 29 that rotates within housing 28. Rotor 29 has a plurality of fins 30 that form sealable pockets 31 in which fruit is received and transferred therein to steam chamber 14. Pressure steam chamber 14 includes a long, cylindrical housing 32, which encloses an elongated variable speed flighted auger 33, which moves fruit from feed valve 12 to outlet valve 16. The capacity of an auger-type steam chamber is limited by its ability to transmit heat to the fruit as the processing rate and the depth of fruit in the steam chamber both increase. The present invention overcomes processing rate limitations inherent in the design of steam chamber 14 by adding an additional heating stage. Conveyor enclosure 26 forms part of the additional heating stage, which is referred to herein as the first-stage heating process, and steam chamber 14 forms the second-stage heating process.

Outlet valve 16 is similar to inlet feed valve 12 and includes a circular housing 36 and a rotor 37. Rotor 37 has a plurality of fins 38, which form pockets for transferring fruit to an inclined chute 40, which delivers the fruit to cable peeler 20. A steam vent 39 is mounted to housing 36 and functions to remove steam from the pressure outlet valve 16. A mechanism for drawing a vacuum is also provided, but not shown, in outlet valve 16. The flexible cable peeler 20 is similar to a peeler described in U.S. Pat. No. 4,023,477. Below the flexible cable peeler 20 is a one dimensional funnel 60. Below the one dimensional funnel 60 is a linear auger 61. Pinch roller assembly 22 is located down slope m from cable peeler 20. Reference is made to U.S. Pat. No. 5,682,812 for a more detailed discussion of the operation of the foregoing components.

While the steam peeler apparatus and method of the present invention are compatible with a variety of fruit and vegetables, the description herein uses tomatoes for illustration of the invention.

Referring to FIGS. 2 and 3, conveyor 12 is shown to include a vertical section 70, and a horizontal section 72, which together form the L-shape of conveyor 10. The conveyor mechanism of conveyor 10 is similar to that shown and described in my U.S. Pat. No. 5,682,812 and sold as Model No.

SP-20 by FMC Corporation of Madera, Calif. Briefly, conveyor 10 includes an upright strongback column 74 that supports to end plates 91 and bottom end plates 89, 89' which support front channel 76 and rear channels 78 which in turn support lateral braces 75, to form a substantially rectangular frame support structure of the conveyor. A pair of vertical chain guide rails 80, 82 are mounted to lateral braces 75. As discussed later, guide rails 80, 82 guide chain rollers of the conveyor chains, which in turn move the buckets. Again, the two-stage heating apparatus of the present invention is compatible with different conveyor mechanisms and support frames from that shown.

Vertical conveyor section 70 includes a front guard 84 and a front hopper 86, which together define an inlet receptacle 88 for receiving tomatoes from a delivery mechanism such as a flume or conveyor. Once tomatoes are delivered into hopper 86, they are picked up by a series of conveyor buckets (not shown), which carry the tomatoes vertically up into a first stage heating enclosure 90. The flow of tomatoes into the buckets is momentarily sheared by the front lip of each bucket as the bucket rises above the level of tomatoes. Each bucket picks up as many tomatoes as the speed of the buckets allows. Tomatoes deflected from a bucket will fall into the next bucket.

Heating enclosure 90 is formed by a set of panels (not shown) that enclose horizontal conveyor section 72 and the upper portion of vertical conveyor section 70. The set of panels include a pair of side plate supports 91, 93, which provide the main structural support for the horizontal conveyor section. Enclosure 90 also includes a back panel 136 and an underside panel 140, discussed later. Enclosure 90 extends down to point 97 along the vertical conveyor section, but can be extended farther down the vertical conveyor if desired to increase the duration of the first-stage heating process.

Within enclosure 90, horizontal conveyor 72 includes idler sprockets 92, 94 and drive sprocket 96, which powers chain drive 95, shown in phantom. Drive sprocket 96 is driven by a drive belt 98, which is driven off of the drive mechanism of the feed valve (not shown). A bottom take-up sprocket 99 provides a return for chain drive 95. Heating enclosure 90 also includes a steam heat introduction device 100, which includes a series of pipes, fittings and nozzles that are discussed in more detail later.

Referring to FIG. 4, a conveyor bucket 102 is shown carried by short mount plates 104, which in turn are mounted by brackets 106 to chain rollers 108. Along horizontal conveyor section 72, plates 104 are each slidingly supported and guided by a series of wear plates 110 that are mounted to a lateral chain guide support brace 112, which in turn is supported by side plates 91, 93. As the conveyor chains of the conveyor move buckets 102 along horizontal section 72, buckets 102 are oriented upright and plates 104 slide over wear plates 110. Also secured to alternating chain rollers are flat spacer plates (not shown), which form a back stop and support surface for the tomatoes carried by the buckets. When the buckets move into horizontal conveyor section 72, the tomatoes in the buckets tend to fall partially out of the buckets and onto the spacer plates and form an angle of repose that may approximate 45°. As discussed later, the tomatoes are also support laterally by the heating enclosure.

Heating enclosure 90 includes a bottom pan 113 that is supported by braces 112. Bottom pan 113 extends underneath the horizontal section of the conveyor to provide a steam seal on the underside of the conveyor and also to capture any tomatoes or tomato material that may escape from the conveyor. Heating enclosure 90 also includes a top panel 114 that extends over the horizontal conveyor section and is supported between a pair of side panels 116, 118. L-shaped brackets 120 carry side panels 116, 118 and are in turn mounted to side plates 91, 93 by means of longitudinal plate brackets 122. A longitudinal filler strip 124 is mounted over plate brackets 122 to seal between side plates 91, 93 and enclosure side panels 116, 118. Heating enclosure 90 is formed in part by top panel 114, side panels 116, 118, filler stripes 124, side plates 91, 93, and bottom pan 113. As discussed in more detail later, a series of nozzles 126 are secured in side panels 116, 118 for connection to the steam introduction system.

Side panels 116, 118 also function as lateral support surfaces for the tomatoes as the tomatoes move along the horizontal conveyor section. Tomatoes from each bucket spill out onto the spacer plates of the conveyor, as the buckets rotate upwardly onto the horizontal conveyor section, and are supported by their own bucket and the preceding bucket, and laterally by side panels 116, 118. When the buckets reach the downwardly curved forward end of the horizontal conveyor section, the tomatoes spill forwardly onto the enclosure, which leads to the inlet of the feed valve.

Referring to FIG. 5, heating enclosure 90 also includes curved front and back top panels 130, 132, which are secured adjacent flat top panel 114 and are mounted to the side plates (only side plate 93 shown) by means of brackets 120, 122. As can be seen, filler strips 124 wrap around the curved front and back ends of the upper run of horizontal conveyor section 72. Since steam rises, the lower run of the horizontal conveyor section need not be sealed or tightly enclosed. Along the infeed side of the conveyor, a vertical back plate 136 is mounted between beams 76, in order to enclose the upper portion of the vertical conveyor section. Back plate 136 joins with curved panel 132 to close off the top back part of the heating enclosure.

Referring briefly back to FIG. 2, enclosure 90 also includes an underside plate 140 that is mounted between the side plates and encloses the inner side of the vertical conveyor section. Underside plate 140 is secured at its upper end to one side edge of the inlet to the feed valve. Also, as can be seen in FIG. 2, side plate 91 (as well as the other side plate) are somewhat triangular in shape as they enclose the sides of the conveyor. Steam injected into enclosure 90 is allowed to escape through cracks and gaps formed by the enclosure and, if desired, through vent holes or pressure valves (not shown) in the enclosure walls.

Referring to FIG. 6, steam injection device 100 includes an inlet steam line 150, which taps off of the steam system of the main steam chamber. Inlet steam line 150 includes a vertical section 152, off of which a series of short steam delivery tap lines 154 extend and join with nozzles 156 secured to the vertical section of the heating enclosure. Each tap line 154 includes a shut-off valve 158, which may selectively be opened and closed to affect the extent of heating and length of time the tomatoes are exposed to the first stage heating provided within enclosure 90.

As shown in FIG. 7, steam inlet line 152 branches at T-line 160 into side inlet lines 162, 164, which extend first laterally outwardly of side plates 91, 93, then angle up and forwardly, and then become horizontal and substantially coplanar with top panel 114 of enclosure 90. Along their upwardly angled sections, lines 162, 164 each include a pair of tap lines 168, 170, which connect with nozzles 172 mounted to side panels 116, 118. Again, shut-off valves 174 are provided for selective control of heat exposure.

As shown in FIG. 8, along their horizontal sections, lines 162, 164 include a series of five tap lines 180 that connect with nozzles 182 and include shut-off valves 184. Tap lines 180 direct steam into heating enclosure 90 and provide a first-stage of heating along the path of movement of the tomatoes right up to entry of the tomatoes into the inlet feed valve.

A processing rate of 40 tons/hr. was achieved with a processing time of 23 seconds, broken down into a 5 second first stage heating step and a 18 second stage heating step.

Introduction of additional heating in the elevator and a lengthening of the pressurized steam chamber can achieve throughput of up to 60 tons/hr. with processing times of 32 seconds for a skin depth of 0.5 mm to reach 242° F. The 32 second processing time was divided into a 20 second first stage heating process in the conveyor steam chamber, followed by a 12 second heating process in the pressurized steam chamber. Additional tests were performed to determine optimum skin depth/temperature relationships for achieving best peeling performance. It was determined that a skin depth of 0.5 mm and a critical temperature of 242° F. produced the best results.

Introduction of additional heating alone can achieve a processing rate of 50 tons/hr. with a processing time of 29 seconds to achieve 242° F. at 0.5 mm depth. This is accomplished by dividing the processing time into a 15 second first stage heating step followed by a 12 second stage heating step. The duration of the first stage heating step can be adjusted as desired to vary the depth of heating in the tomato skins by changing the number of open shut-off valves or by changing the speed of the conveyor. The through-put of the system can be changed by changing the bucket size and also by changing the speed of the conveyor. However, the conveyor speed must take into account the duration of the first stage of heating.

FIG. 9 shows an alternative first-stage heating apparatus 200 in the form of a hot water flume. Flume apparatus 200 includes a dewatering grate 202, which receives tomatoes from the end of an delivery flume 204. Floating tomatoes move from flume 204 down grate 202 and into a first-stage heating tank 206. Water from delivery flume 204 is re-directed to the flume by a flume water return 205. Heating tank 206 is provided with a submerged steam heating coil 208, which extends the length of the heating tank. The length of heating tank 206 and the design of heating coil 208 can vary to affect the skin temperature and depth of heating provided the tomatoes by the first-stage heating process.

A second dewatering grate 210 is provided at the outlet of heating tank 206 and a heating tank water return 212 and pump 214 are provided to return hot water to the upstream end of the heating tank. Buckets 102, moving upwardly as shown by arrow 216, are loaded with tomatoes falling down grate 210 from heating tank 206.

The unique two stage heating process of the present invention achieves a high capacity steam peeling rate that maximizes fruit throughput, thus maximizing yield and peeling rate. Because the peeling process of the present invention achieves much higher processing rates than prior art systems, modification of upstream and downstream equipment may be necessary in order for these components to accommodate higher rates.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

The invention claimed is:

1. A method of heating skins of fruit for removal of the skins, comprising the steps of:

conveying the fruit on a conveyor to a pressurized steam chamber, while the fruit is being conveyed to the pressurized steam chamber, pre-heating the fruit with steam heat within an enclosure of the conveyor that raises the temperature of the fruit skins to a first predetermined temperature, and in the pressurized steam chamber, heating the skins of the fruit with steam heat to a second predetermined temperature sufficient to separate the skins of the fruit upon cooling.

2. The method of claim 1 wherein, the step of conveying the fruit to a pressurized steam chamber includes conveying the fruit first up a vertical conveyor section and then a horizontal conveyor section to the steam chamber.

3. The method of claim 2 wherein, the step of pre-heating the fruit with steam heat includes directing steam through a series of nozzles positioned along the vertical and horizontal conveyor sections.

4. The method of claim 3 wherein, the step of pre-heating the fruit with steam heat along the horizontal section includes directing steam from the lateral sides of the fruit while the fruit is conveyed.

5. The method of claim 1 and further comprising the step of transferring the fruit through a feed valve from the conveyor to the steam chamber.

6. The method of claim 5 wherein, the step of pre-heating the fruit with steam heat within an enclosure of the conveyor includes heating the fruit within the enclosure immediately prior to conveying the fruit into the feed valve.

7. The method of claim 2 wherein, the step of pre-heating the fruit with steam heat within the vertical enclosure section includes conveying the fruit vertically along a distance that corresponds to the through-put of fruit by the pressurized steam chamber.

* * * * *